UNITED STATES PATENT OFFICE

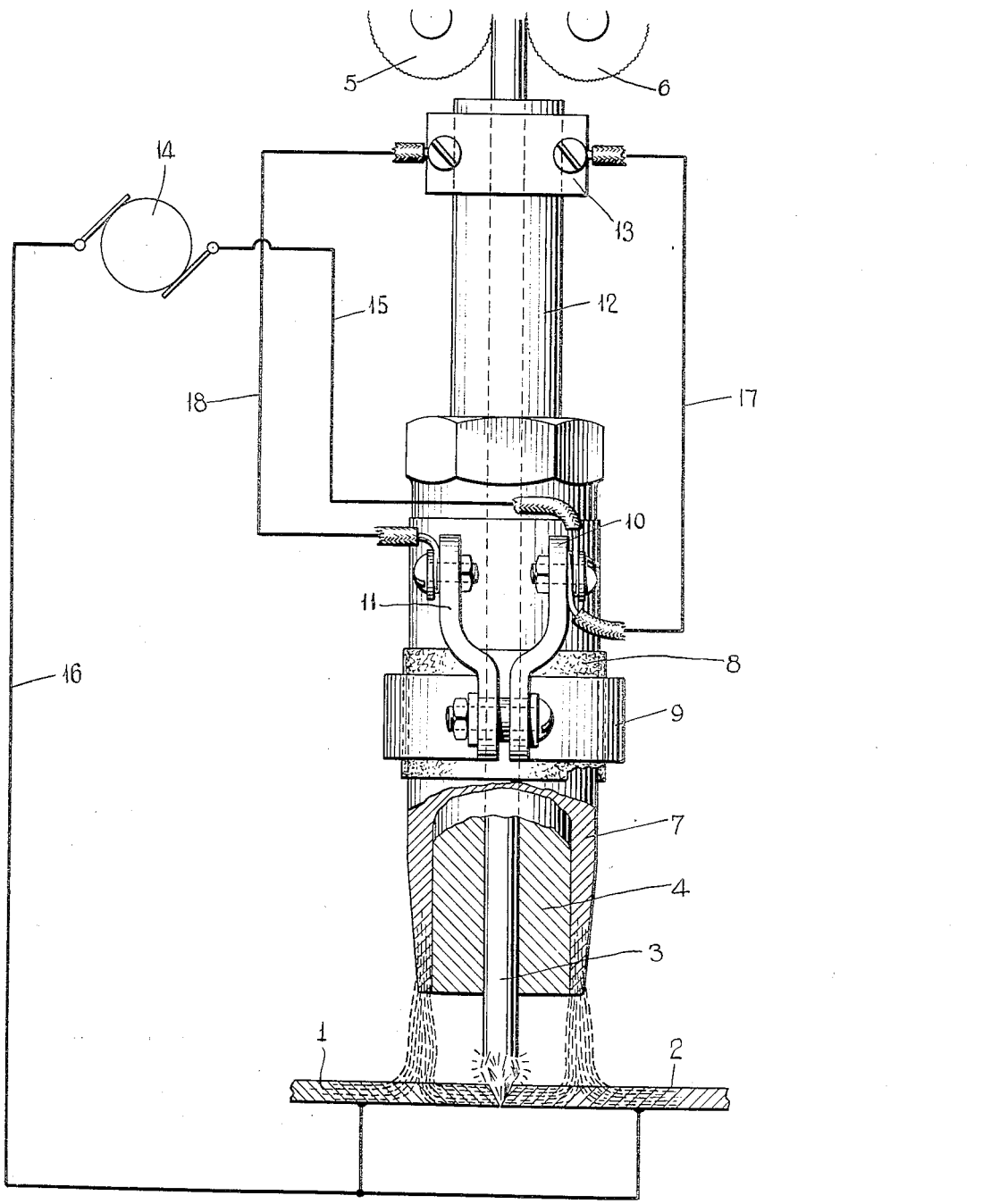

LENNART ANDREN AND ROBERT PATTERSON, OF BRIDGEPORT, CONNECTICUT, ASSIGNORS TO AMERICAN CHAIN COMPANY, INC., A CORPORATION OF NEW YORK

PROCESS OF AND MEANS FOR MAGNETICALLY CONTROLLING WELDING ARCS

Application filed December 21, 1928. Serial No. 327,519.

The present invention relates to welding by the aid of electric current in which an arc is struck between a metallic electrode and the work to be welded, and metal from the electrode is deposited upon the work to form the weld.

It is a well known fact that an essential feature in successfully carrying out this method of welding, is to maintain the conditions in the electric arc constant. The conditions principally influencing the successively welding operations are, generally speaking, in the first place, the length of the arc, and secondly, the steadiness of the arc. In hand welding, i. e., welding in which a portable apparatus is employed and the welding electrode is guided by hand over the work, the length of the arc may be satisfactorily controlled by a skilled operator. Also in machine work, i. e., welding in which the feed of the electrode is mechanically controlled, the length of the arc may be regulated with even more certainty than in hand welding. However, the other condition above referred to, namely, that of maintaining a steady arc, offers a serious problem not only in hand welding but to an even greater extent in machine welding. The steadiness of the arc is a function of certain specific characteristics of the metal electrode and also of a number of other phenomena occurring in and around the arc. In hand welding, an operator who has had long training and has acquired considerable skill, may control the steadiness of the arc with a considerable degree of success, but in machine welding, it is well nigh impossible to introduce those slight variations in the conditions of the arc which in hand welding are automatically performed in response to reactions of the subconscious mind and the training of the operator.

Machine welding is used principally for welding joints of considerable length and plain design, such, for instance, as the seams in tanks and the like. It is evident that the steadiness of the arc is an essential factor in such work and if the arc is frequently extinguished, the weld will be unsound and unsafe and time will be lost in the welding operation.

It is an object, therefore, of the present invention to provide a means for and method of stabilizing an arc against disturbing influences, which means and method will be applicable not only to machine welding but also to hand welding.

It has been found that the unsteadiness of a welding arc is to a very large extent caused by uncontrollable magnetic fluxes developed by the welding current in the metal masses of the apparatus and the work to be welded. And it is an object of our invention to exclude the disturbing action of such magnetic fluxes by surrounding the arc with a shield of controlled magnetic flux.

We are aware that the prior patent art discloses the idea of using magnetic flux in connection with welding arcs. In one of these patents, the magnetic flux is generated in the welding arc itself for the avowed purpose of directing the stream of molten metal from the rod to the work. Another patent deals with a carbon welding arc and in this case too, magnetic flux is fed into the arc itself. We do not know of any case in which the magnetic flux has been employed as a shield for the arc instead of passing through the arc itself. Our experience has shown that it is highly undesirable to introduce magnetic flux into the arc as this merely increases the unsteadiness of the arc. To properly stabilize the arc, the flux must form a cylindrical shield about the arc which will react on the flux generated by the arc itself with the result that the arc tends to remain centered within the cylindrical shield.

The accompanying drawing illustrates our invention somewhat diagrammatically showing a portion of a welding machine joining two pieces of work and showing also the electrical connections employed for generating the controlled magnetic flux.

In the drawing, the work is represented by two pieces of metal 1 and 2 which are to be welded together. The welding electrode consists of a metal rod 3 which passes through a nozzle 4. The rod is fed to the work by a suitable means here illustrated as consisting of a pair of rollers 5 and 6 engaging opposite sides of the rod. The mechanism for operating the rollers to control the feed forms no part of the present invention and consequently is not illustrated.

The nozzle 4 is made of brass or of some other non-magnetic material. Surrounding the nozzle 4 is a shell 7 of iron or other highly paramagnetic material. Fitted over the shell 7 is a sleeve 8 of asbestos or other suitable material which will serve as an insulator against heat and electric current. Fitted about the asbestos sleeve is a ring 9 of copper or other suitable electrically conductive material. This ring is split and is clamped about the sleeve 8 by a bolt 9'. However, the ring's ends are insulated from each other and are formed with terminal members 10 and 11. The split ring 9 constitutes a coil of one turn about the shell 7 so that current passing through the ring will generate magnetic flux in the shell.

Secured to the stem 12 of the nozzle 4 is a contact block 13. Current for the arc to be struck between the electrode 3 and the work is supplied by a suitable generator 14. The positive pole of this generator is connected by a wire 15 to the terminal 10 while the negative pole of the generator is connected by a wire 16 to the plates 1 and 2. From the terminal 10, there is a lead 17 running to the contact block 13 while another lead 18 connects the block 13 with the terminals 11.

In operation, current to supply the arc is fed from the generator 14 to the terminal 10 where it divides, part of it passing around the coil 9 before reaching the contact block 13. Thence, the current flows through the nozzle 4 and rod 3 and maintains an arc between the end of the rod 3 and the work, the circuit being completed through wire 16 to the opposite pole of the generator. The current which passes through the ring 9 generates magnetic flux which flows through the shell 7 and thence jumps from the shell to the work in the form of a cylinder surrounding the arc. This cylinder of flux serves to steady the arc and protect it from outside influences. The flux supplied to the cylinder 7 is constant and serves as a stabilizer reacting on the flux generated by the arc itself and centering the arc.

It is to be noted that because the shell 7 is highly paramagnetic, the flux generated by the coil 9 is largely confined to the shell. This is an important feature of our invention as it has been found that flux introduced directly into the arc is apt to be disturbing rather than stabilizing, and it is only by surrounding the arc with a shield of magnetic flux that the arc may be kept steady.

It will be obvious that the invention described above will be applicable to hand operated apparatus as well as to automatic welding machines and semi-automatic. Also, that variations may be made in the number of turns in the coil 9 as well as in various details of constructions, and we consider ourselves at liberty to make such changes and modifications of construction and arrangements of parts as fall within the spirit and scope of the following claims.

We claim:

1. In a process of metallic arc welding, the steps which consist in connecting a metallic welding rod to one pole of a source of electrical energy and the work to be welded to the other pole, striking an arc between the rod and the work, feeding the rod toward the work, and generating a cylinder of magnetic flux surrounding but spaced from the arc.

2. In a process of stabilizing a metallic welding arc, the step which consists in generating a substantially cylindrical shield of metallic flux surrounding but spaced from the arc.

3. In a process of metallic arc welding, the steps which consist in connecting a metallic welding rod to one pole of a source of electrical energy and the work to be welded to the other pole, striking an arc between the rod and the work, feeding the rod toward the work, employing a fractional part of the energy fed to the arc to generate magnetic flux, and confining said flux largely within a cylindrical path surrounding but spaced from the rod, whereby the flux will form a shield surrounding the arc.

4. In an apparatus of the character described, a nozzle of a non-magnetic material through which a metallic welding rod is adapted to be fed to maintain an arc, and a magnet surrounding the nozzle and extending to the immediate proximity of the arc.

5. In an apparatus of the character described, a nozzle of non-magnetic material through which a metallic welding rod is adapted to be fed, a shell of highly paramagnetic material surrounding the nozzle and a coil about the shell but electrically insulated therefrom.

6. In an apparatus of the character described, a nozzle of non-magnetic material through which a metallic welding rod is adapted to be fed, a shell of highly paramagnetic material surrounding the nozzle, a coil about the shell and electrical and thermal insulation between the coil and the shell.

7. In an apparatus of the character described, a nozzle of non-magnetic material through which a metallic welding rod is adapted to be fed, a shell of highly paramagnetic material surrounding the nozzle, a coil about the shell and a sleeve of asbestos fitted between the shell and the coil.

In witness whereof we have signed this specification.

LENNART ANDREN.
ROBERT PATTERSON.